United States Patent
Ishii et al.

(10) Patent No.: US 10,983,656 B2
(45) Date of Patent: Apr. 20, 2021

(54) IMAGE PROCESSING SYSTEM AND IMAGE PROCESSING METHOD FOR PLAYBACK OF CONTENT

(71) Applicant: SONY CORPORATION, Tokyo (JP)

(72) Inventors: Tomohiro Ishii, Tokyo (JP); Tetsuo Ikeda, Tokyo (JP); Atsushi Izumihara, Kanagawa (JP); Masanari Koyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 637 days.

(21) Appl. No.: 15/105,718

(22) PCT Filed: Nov. 10, 2014

(86) PCT No.: PCT/JP2014/079760
§ 371 (c)(1),
(2) Date: Jun. 17, 2016

(87) PCT Pub. No.: WO2015/098320
PCT Pub. Date: Jul. 2, 2015

(65) Prior Publication Data
US 2016/0328093 A1 Nov. 10, 2016

(30) Foreign Application Priority Data
Dec. 27, 2013 (JP) .................................. 2013-273232

(51) Int. Cl.
*G06F 3/0481* (2013.01)
*G06F 3/0484* (2013.01)
(Continued)

(52) U.S. Cl.
CPC .......... *G06F 3/0481* (2013.01); *G06F 3/0484* (2013.01); *G06F 3/0488* (2013.01);
(Continued)

(58) Field of Classification Search
CPC .... G06F 3/0488; G06F 3/0484; G06F 3/0481; G06F 3/04845; G06F 3/04847; G06F 3/165; G11B 27/00
(Continued)

(56) References Cited

U.S. PATENT DOCUMENTS 6,081,266 A * 6/2000 Sciammarella ......... G06F 3/165
715/727
7,844,901 B1 * 11/2010 Joseph ................... G11B 27/34
715/716
(Continued)

FOREIGN PATENT DOCUMENTS

CN 101719375 A 6/2010
JP 2004-198759 A 7/2004
(Continued)

OTHER PUBLICATIONS

Extended European Search Report of EP Patent Application No. 14874323.0, dated Jul. 14, 2017, 07 pages.
(Continued)

*Primary Examiner* — Henry Orr
(74) *Attorney, Agent, or Firm* — Chip Law Group

(57) ABSTRACT

Provided is an information processing system including an output control unit that controls a display output unit in a manner that a display object indicating a sequential passage of time is displayed. The display object indicates a playback position of content, the display object including a plurality of areas corresponding to a plurality of pieces of the content. The present technology enables a user to intuitively perceive the relationship between the plurality of pieces of content and the piece of content that is currently being played back.

17 Claims, 11 Drawing Sheets

(51) Int. Cl.
*G06F 3/0488* (2013.01)
*G06F 3/16* (2006.01)

(52) U.S. Cl.
CPC ...... *G06F 3/04845* (2013.01); *G06F 3/04847* (2013.01); *G06F 3/165* (2013.01)

(58) Field of Classification Search
USPC .......................................................... 715/716
See application file for complete search history.

(56) References Cited

U.S. PATENT DOCUMENTS

| | | | | |
|---|---|---|---|---|
| 2005/0097480 | A1* | 5/2005 | Care | G06F 3/0481 715/859 |
| 2006/0129933 | A1* | 6/2006 | Land | G11B 27/034 715/723 |
| 2006/0184871 | A1* | 8/2006 | Waters | G06F 3/0481 715/203 |
| 2006/0242550 | A1* | 10/2006 | Rahman | H04N 21/4825 715/203 |
| 2006/0267995 | A1* | 11/2006 | Radloff | G11B 27/105 345/530 |
| 2007/0085759 | A1* | 4/2007 | Lee | G06F 1/1616 345/1.1 |
| 2007/0136679 | A1* | 6/2007 | Yang | H04N 5/44513 715/772 |
| 2007/0239788 | A1* | 10/2007 | Cunningham | G06F 3/04817 |
| 2008/0141123 | A1* | 6/2008 | Kitada | G06F 3/04847 715/255 |
| 2009/0153648 | A1* | 6/2009 | Quennesson | G11B 27/034 348/43 |
| 2010/0231534 | A1* | 9/2010 | Chaudhri | G06F 3/0481 345/173 |
| 2011/0116769 | A1* | 5/2011 | Sugiyama | G06F 3/0481 386/282 |
| 2012/0151320 | A1* | 6/2012 | McClements, IV | G06Q 10/101 715/230 |
| 2012/0210228 | A1* | 8/2012 | Wang | G11B 27/005 715/723 |
| 2014/0075317 | A1* | 3/2014 | Dugan | G06F 3/04842 715/719 |
| 2014/0245115 | A1* | 8/2014 | Zhang | G06F 17/24 715/202 |
| 2014/0310598 | A1* | 10/2014 | Sprague | G06F 16/40 715/716 |
| 2014/0344698 | A1* | 11/2014 | Hohteri | G06F 3/0488 715/720 |

FOREIGN PATENT DOCUMENTS

| | | |
|---|---|---|
| JP | 2006-302345 A | 11/2006 |
| JP | 2007-206809 A | 8/2007 |
| JP | 2008-532182 A | 8/2008 |
| JP | 2008-243259 A | 10/2008 |
| JP | 2010-165337 A | 7/2010 |
| JP | 2012-145984 A | 8/2012 |
| JP | 2012-521049 A | 9/2012 |
| JP | 2013-047967 A | 3/2013 |
| WO | 2009/020103 A | 2/2009 |
| WO | 2009/020103 A1 | 2/2009 |
| WO | 2010/107661 A | 9/2010 |
| WO | 2013/030862 A1 | 3/2013 |

OTHER PUBLICATIONS

Office Action for JP Patent Application No. 2015-554658, dated Jul. 17, 2018, 04 pages of Office Action and 03 pages of English Translation.

Office Action for EP Patent Application No. 14874323.0, dated Jul. 26, 2018, 06 pages of Office Action.

Office Action for JP Patent Application No. 2018-186787, dated May 21, 2019, 03 pages of Office Action and 02 pages of English Translation.

Office Action for JP Patent Application No. 2018-186787, dated Oct. 15, 2019, 04 pages of Office Action and 03 pages of English Translation.

Office Action for JP Patent Application No. 2018-186787, dated Aug. 6, 2019, 09 pages of Office Action and 08 pages of English Translation.

* cited by examiner

IMAGE PROCESSING SYSTEM AND IMAGE PROCESSING METHOD FOR PLAYBACK OF CONTENT

CROSS REFERENCE TO RELATED APPLICATIONS

This application is a U.S. National Phase of International Patent Application No. PCT/JP2014/079760 filed on Nov. 10, 2014, which claims priority benefit of Japanese Patent Application No. JP 2013-273232 filed in the Japan Patent Office on Dec. 27, 2013. Each of the above-referenced applications is hereby incorporated herein by reference in its entirety.

TECHNICAL FIELD

The present disclosure relates to an information processing system, an information processing method, and a program.

BACKGROUND ART

In recent years, in association with development in information and communications technology, the types of contents have become diverse. Typically, when a piece of content is played back, a display object indicating a playback position of the piece of content is displayed (see Patent Literature 1, for example). A user will be able to perceive the playback position of the piece of content by viewing the display object.

CITATION LIST

Patent Literature

Patent Literature 1 JP 2010-165337A

SUMMARY OF INVENTION

Technical Problem

However, a case in which a plurality of pieces of content are played back sequentially is assumed as well. In such a case, it is desired that the user intuitively perceives the relationship between the plurality of pieces of content and the piece of content that is currently being played back.

Solution to Problem

According to the present disclosure, provided is an information processing system including an output control unit that controls a display output unit so that a display object indicating a sequential passage of time is displayed. The display object indicates a playback position of pieces of content and includes a plurality of areas corresponding to the plurality of pieces of content.

According to the present disclosure, provided is an information processing method including controlling a display output unit such that a display object indicating a sequential passage of time is displayed, in which the display object indicates a playback position of a piece of content, the display object including a plurality of areas corresponding to a plurality of pieces of content.

According to the present disclosure, provided is a program for causing a computer to function as an information processing system, in which the information processing system includes an output control unit configured to control a display output unit such that a display object indicating a sequential passage of time is displayed, and in which the display object indicates a playback position of a piece of content, the display object including a plurality of areas corresponding to a plurality of pieces of content.

Advantageous Effects of Invention

As described above, according to the present disclosure, the user may intuitively perceive the relationship between the plurality of pieces of content and the piece of content that is currently being played back. Note that the effects described above are not necessarily limited, and along with or instead of the effects, any effect that is desired to be introduced in the present specification or other effects that can be expected from the present specification may be exhibited.

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Note that the description will be given in the following order.

1. 1. Embodiment of present disclosure
1.1. Exemplary system configuration
1.2. Exemplary functional configuration
1.3. Exemplary display control
1.4. Exemplary hardware configuration
2. Conclusion

1. EMBODIMENT OF PRESENT DISCLOSURE

1.1. Exemplary System Configuration

Figure 1:
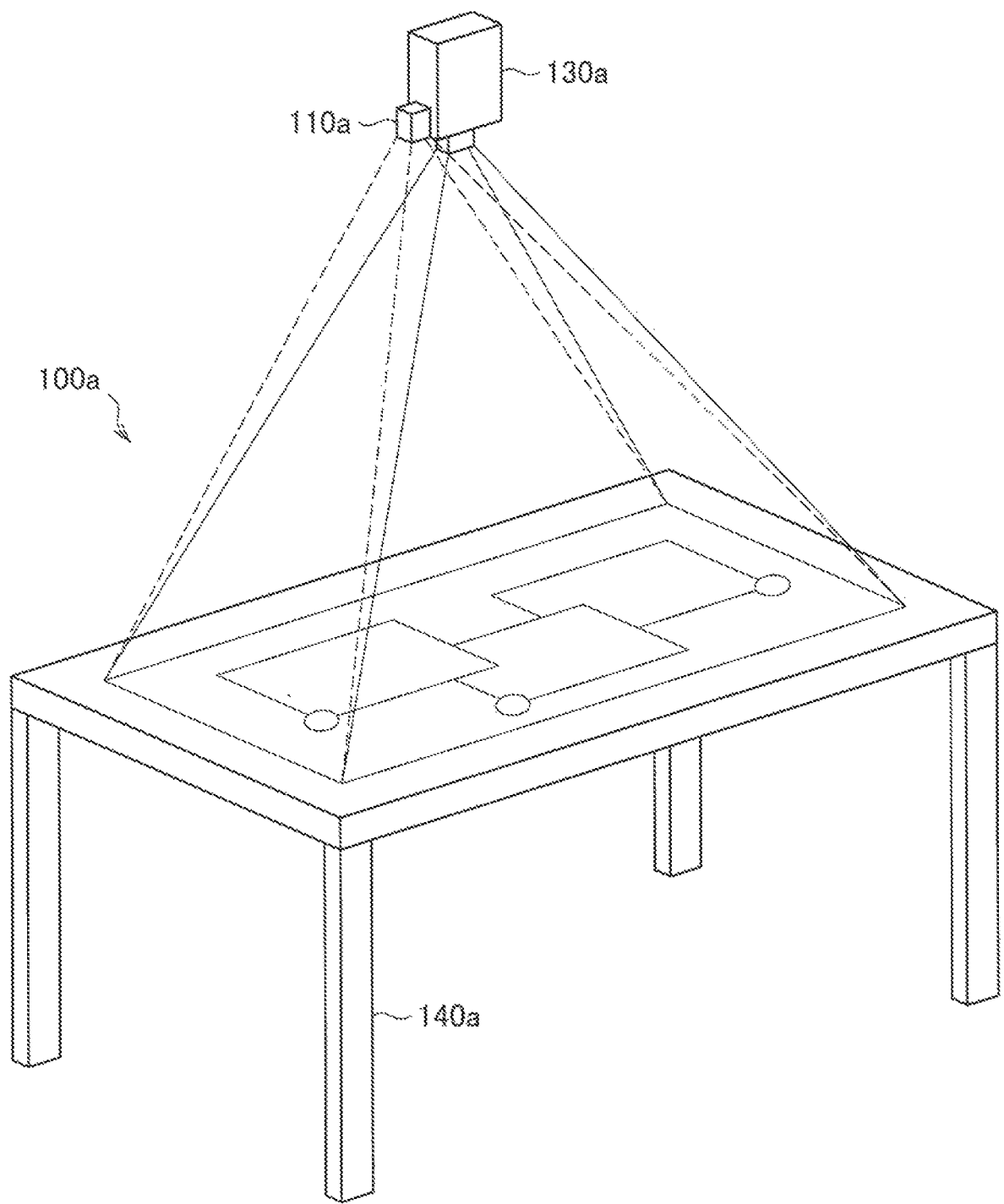
FIG. 1 is an explanatory drawing illustrating an exemplary configuration of an information processing system according to an embodiment of the present disclosure.

An exemplary configuration of an information processing system according to an embodiment of the present disclosure will be described first with reference to the drawings. FIG. 1 is an explanatory drawing illustrating the exemplary configuration of the information processing system according to an embodiment of the present disclosure. Hereinafter, the exemplary configuration of the information processing system according to an embodiment of the present disclosure will be described using FIG. 1.

As illustrated in FIG. 1, an information processing system 100a according to an embodiment of the present disclosure is configured so as to include an input unit 110a and an output unit 130a. The information processing system 100a according to an embodiment of the present disclosure illustrated in FIG. 1 is a system that displays information on an upper surface of a table 140a and that has a user using the information processing system 100a operate the information displayed on the table 140a. As in FIG. 1, a system in which information is displayed on the upper surface of the table 140a is also referred to as "a projection type".

The input unit 110a is a device that inputs the details of an operation of the user using the information processing system 100a and the shapes and patterns of the object placed on the table 140a. In the example illustrated in FIG. 1, the input unit 110a is provided above the table 140a, for example, is provided so as to be hanged down from a top wall. In other words, the input unit 110a is provided so as to be separated from the table 140a that is the object on which the information is displayed. As the input unit 110a, a camera that picks up an image of the table 140a with a single lens, a stereoscopic camera that picks up an image of the table 140a with two lenses and that is capable of recording information in the depth direction, or a microphone for acquiring voice that the user using the information processing system 100a vocalizes and environmental sound of the environment that the information processing system 100a is put under, for example may be used.

When the camera that picks up the image of the table 140a with a single lens is used as the input unit 110a, the information processing system 100a is capable of detecting the object placed on the table 140a by analyzing the image picked up by the camera. Furthermore, when the stereoscopic camera is used as the input unit 110a, visible light cameras or infrared cameras may be used in the stereoscopic camera. By using a stereoscopic camera as the input unit 110a, the input unit 110a will be capable of acquiring depth information. The input unit 110a acquiring the depth information enables the information processing system 100a to detect, for example, a hand and an object that is placed on the table 140a. Furthermore, the input unit 110a acquiring the depth information enables the information processing system 100a to detect the hand of the user coming in contact with the table 140a and the hand becoming separated from the table 140a.

Furthermore, when a microphone is used as the input unit 110a, the microphone used may be an array of microphones for acquiring vocal sound in a specific direction. When an array of microphones is used as the input unit 110a, the information processing system 100a may adjust the sound acquisition direction of the array of microphones in an optional direction.

The output unit 130a is a device that, on the basis of the details of the operation of the user using the information processing system 100a that has been input with the input unit 110a, the content of the information the output unit 130a is outputting, and information on the shape, the pattern, and the like of the object placed on the table 140a, displays information on the table 140a and outputs audio. As the output unit 130a, for example, a projector and a loudspeaker are used. In the example illustrated in FIG. 1, the output unit 130a is provided above the table 140a, for example, is provided so as to be hanged down from a top wall. When the output unit 130a is constituted by a projector, the output unit 130a projects information on the upper surface of the table 140a. When the output unit 130a is constituted by a loudspeaker, the output unit 130a outputs audio on the basis of an audio signal. When the output unit 130a is constituted by a loudspeaker, the number of the loudspeaker may be single or may be plural. When the output unit 130a is constituted by a plurality of loudspeakers, the information processing system 100a may limit the loudspeaker that outputs the audio or may adjust the direction in which the audio is output.

Furthermore, when the information processing system 100a is of a projection type as illustrated in FIG. 1, lighting equipment may be included in the output unit 130a. When lighting equipment is included in the output unit 130a, the information processing system 100a may, on the basis of the information input by the input unit 110a, control the state of the lighting equipment, such as lights-on and lights-off.

The user that uses the information processing system 100a may operate the information displayed on the table 140a by the output unit 130a by putting a finger or the like on the table 140a. Furthermore, the user using the information processing system 100a placing an object on the table 140a and having the input unit 110a recognize the object can perform various operations related to the recognized object.

Note that although not shown in FIG. 1, another device may be connected to the information processing system 100a. For example, a piece of lighting equipment for lighting the table 140a may be connected to the information processing system 100a.

Figure 2:
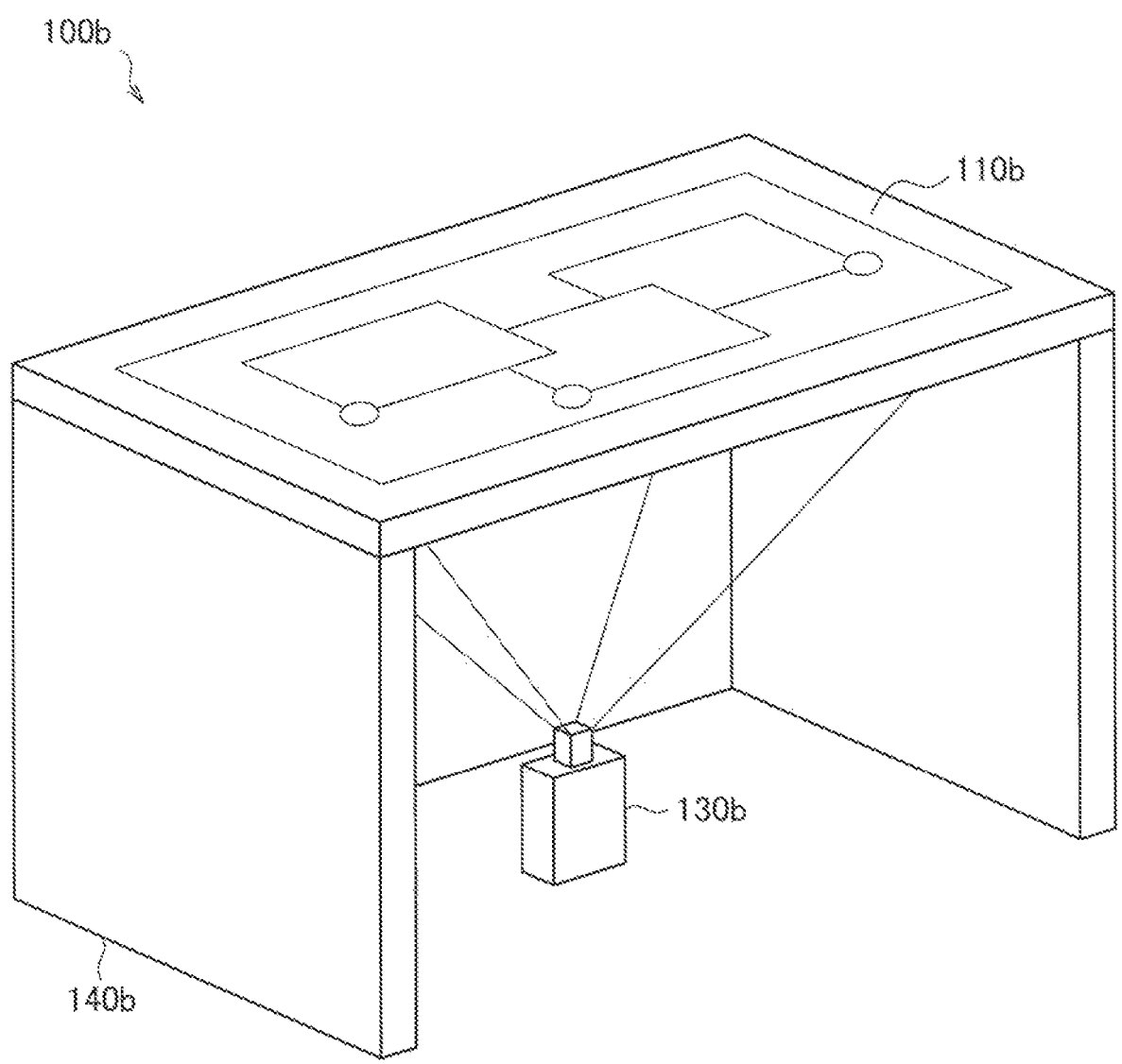
FIG. 2 is an explanatory drawing illustrating an exemplary configuration of an information processing system according to an embodiment of the present disclosure.
Figure 3:
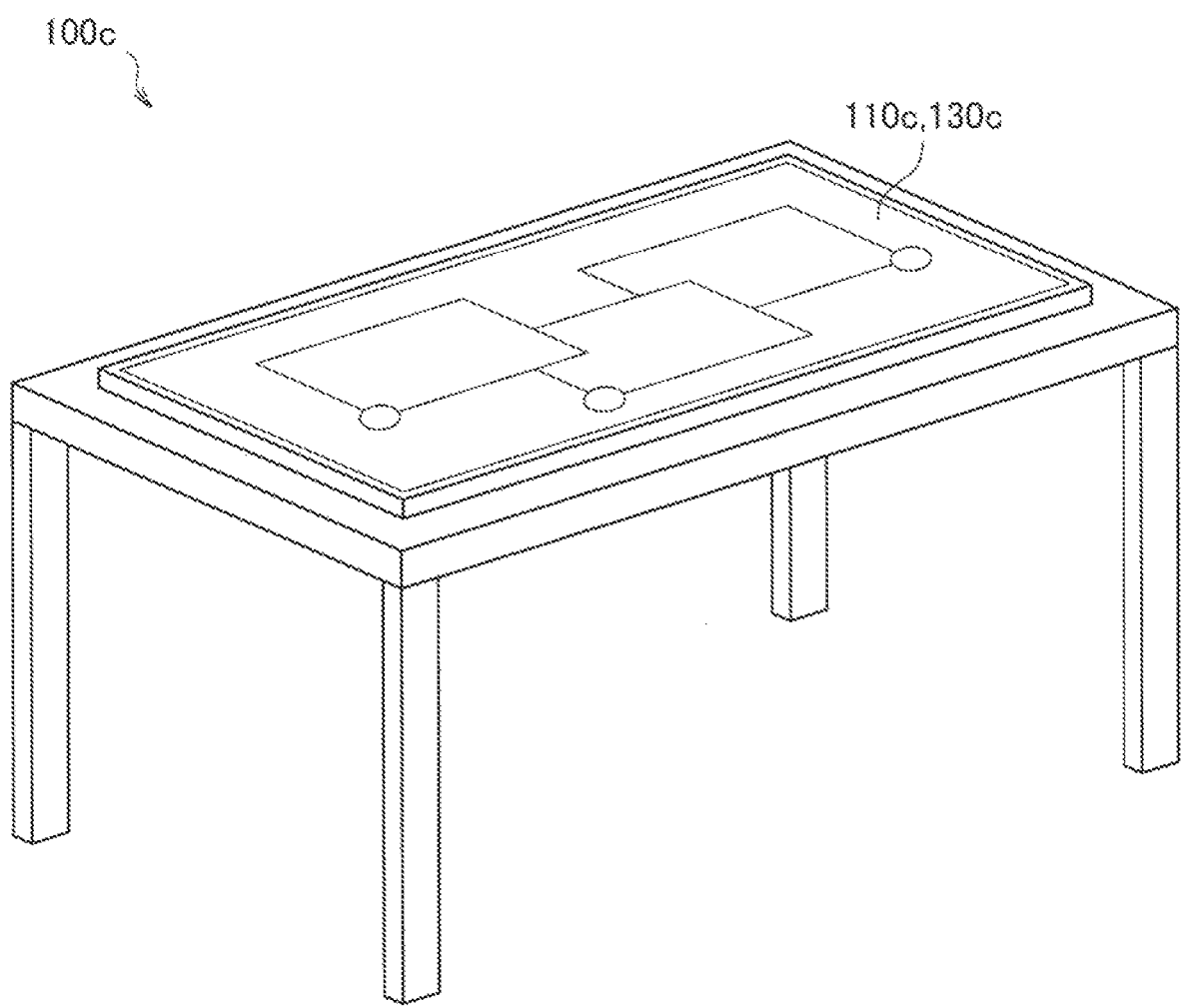
FIG. 3 is an explanatory drawing illustrating an exemplary configuration of an information processing system according to an embodiment of the present disclosure.
Figure 4:
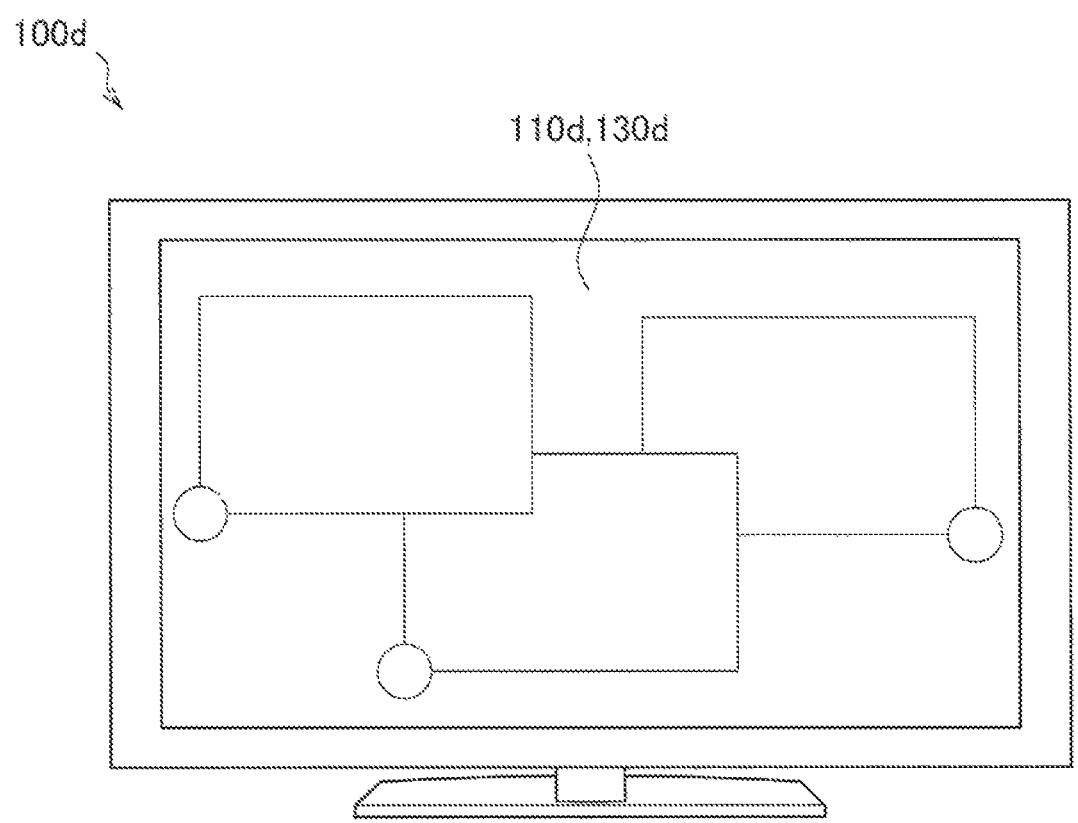
FIG. 4 is an explanatory drawing illustrating an exemplary configuration of an information processing system according to an embodiment of the present disclosure.

In the present disclosure, the form of the information processing system is not limited to that illustrated in FIG. 1. FIGS. 2 to 4 are explanatory drawings further illustrating other exemplary forms of the information processing system related to an embodiment of the present disclosure.

Illustrated in FIG. 2 is an explanatory drawing illustrating an exemplary configuration of an information processing system 100b according to an embodiment of the present disclosure, and is configured to display information on a surface of a table 140b by projecting information on the output unit 130a from below the table 140b. In other words, the surface of the table 140b is formed of a transparent material, such as a glass plate or a transparent plastic plate. The system displaying information on the upper surface of the table 140b by having the output unit 130a project information from below the table 140b as in FIG. 2 is also referred to as a "rear projection type". In the example illustrated in FIG. 2, although a configuration in which an input unit 110b is provided on the surface of the table 140b is illustrated, in a similar manner to that of the information processing system 100a illustrated in FIG. 1, the input unit 110b may be provided below the table 140b so as to be separated from the table 140b.

Illustrated in FIG. 3 is an explanatory drawing illustrating an exemplary configuration of an information processing system 100c according to an embodiment of the present disclosure. In FIG. 3, a state in which a touch panel display is placed on a table is illustrated. In the case of a touch panel display as above, an input unit 110c and an output unit 130c may be configured as the touch panel display. In the information processing system 100c illustrated in FIG. 3, in a similar manner to the information processing system 100a illustrated in FIG. 1, a camera for detecting the position of the user may be provided above the touch panel display.

Illustrated in FIG. 4 is an explanatory drawing illustrating an exemplary configuration of an information processing system 100d according to an embodiment of the present disclosure. In FIG. 4, a state in which a flat panel display is placed on a table is illustrated. In the case of a flat panel display as above, an input unit 110d and an output unit 130d may be configured as the touch panel display.

Note that in the following description, the configuration of the information processing system 100a in which the input unit 110a and the output unit 130a are provided above the table 140a, as illustrated in FIG. 1, in other words, the configuration in which the input unit 110a and the output unit 130a are provided so as to be separated from the display surface of the information will be described as an example. In the following description, the information processing system 100a, the input unit 110a, and the output unit 130a will be merely described also as an information processing system 100, an input unit 110, and an output unit 130, respectively.

1.2. Exemplary Functional Configuration

Figure 5:
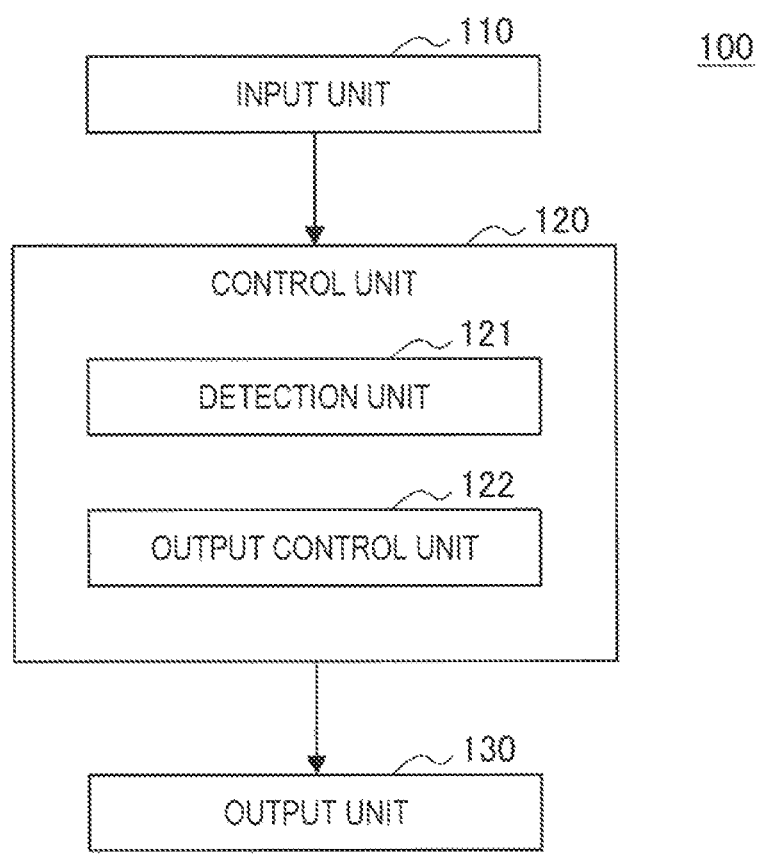
FIG. 5 is an explanatory drawing illustrating an exemplary functional configuration of an information processing system according to an embodiment of the present disclosure.

Subsequently, an exemplary functional configuration of an information processing system according to an embodiment of the present disclosure will be described. FIG. 5 is an explanatory drawing illustrating an exemplary functional configuration of the information processing system according to the embodiment of the present disclosure. Hereinafter, the exemplary functional configuration of the information processing system according to an embodiment of the present disclosure will be described using FIG. 5.

As illustrated in FIG. 5, the information processing system 100 according to an embodiment of the present disclosure is configured so as to include the input unit 110, a control unit 120, and the output unit 130.

The input unit 110 inputs the details of the operation of the user using the information processing system 100 and the shapes and patterns of the object placed on a surface (the table 140a illustrated in FIG. 1, for example) on which the output unit 130 outputs information. Information, such as the operation details and the shape and pattern of the object, input with the input unit 110 is transmitted to the control unit 120.

When the information processing system 100 is of a projection type, the input unit 110 may be constituted by a camera configured with a single lens, a stereoscopic camera configured with two lenses, or a microphone, for example.

The control unit 120 executes control of each unit of the information processing system 100. For example, using information input with the input unit 110, the control unit 120 generates information output from the output unit 130. As illustrated in FIG. 5, the control unit 120 is configured so as to include a detection unit 121 and an output control unit 122. The detection unit 121 executes a process that detects the operation details of the user using the information processing system 100, the content of the information output by the output unit 130, the shape and pattern of the object placed on the surface (the table 140a illustrated in FIG. 1, for example) on which the output unit 130 outputs information. The content detected by the detection unit 121 is transmitted to the output control unit 122. On the basis of the content detected by the detection unit 121, the output control unit 122 executes control that generates information output from the output unit 130. The information generated by the output control unit 122 is transmitted to the output unit 130.

The control unit 120 may be configured of a central processing unit or a central arithmetic processing unit (CPU), for example. When the control unit 120 is configured of a device such as a CPU, the device may be configured of an electronic circuit.

Furthermore, although not shown in FIG. 5, the control unit 120 may have a communication function for performing radio communication between other devices or may have a function of controlling the operation of another device, such as the lighting equipment, for example, that is connected to the information processing system 100.

The output unit 130 outputs information according to information input by the input unit 110 such as the operation details of the user using the information processing system 100, the content of the information output by the output unit 130, and the shape and pattern of the object placed on the surface (the table 140a illustrated in FIG. 1, for example) on which the output unit 130 outputs information. The output unit 130 outputs information on the basis of the information generated by the output control unit 122. The information output by the output unit 130 includes information on the information displayed on the display surface and audio that is output from the loudspeaker (not shown) and the like.

Description has been given above on the exemplary functional configuration of the information processing system 100 according to an embodiment of the present disclosure using FIG. 5. An exemplary information display control with the information processing system 100 according to an embodiment of the present disclosure will be given next. Note that, as illustrated in FIG. 1, an example in which information is displayed on the upper surface of the table 140a will be described below.

Furthermore, although a case in which the operation of the user is detected from an image taken by the input unit 110a will be described mainly, the operation of the user may be detected by a touch panel that detects the contact or approach of the finger of the user or may be detected by a detection device that detects a stylus.

1.3. Exemplary Display Control

Hereinafter, a case in which five pieces of content (hereinafter the five pieces of content will be referred to as "pieces of content C1 to C5") are played back sequentially will be described as an example. However, the number of pieces of content subject to playback is not particularly limited to any number as long as it is plural. Furthermore, the device that performs playback of the pieces of content is not particularly limited to any device. For example, the playback of the pieces of content may be performed inside (the control unit 120, for example) the information processing system 100 or may be performed outside (a server, for example) the information processing system 100. Note that in the present description, it is mainly assumed that the piece of content are pieces of audio content; however the type of the pieces of content is not particularly limited to any content and may be pieces of image content (still image content, moving image content, for example).

Figure 6:
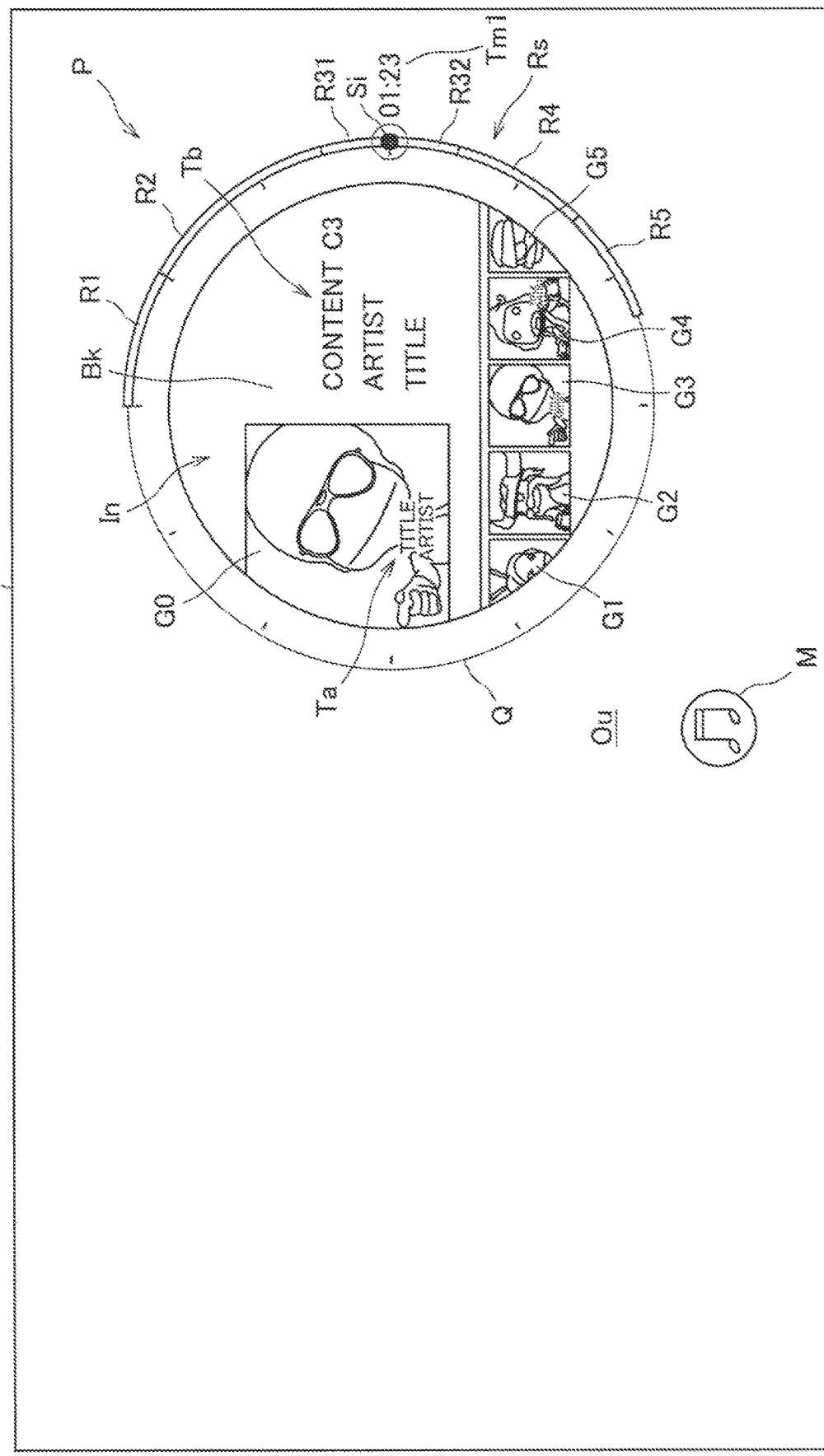
FIG. 6 is a diagram illustrating an example of a GUI in which display thereof is controlled with an information processing system 100 according to an embodiment of the present disclosure.

FIG. 6 is a diagram illustrating an example of a GUI in which display thereof is controlled with the information processing system 100 according to an embodiment of the present disclosure. As illustrated in FIG. 6, an operation object P is displayed. The output control unit 122 controls the output unit 130 so that a display object Rs that indicates a sequential passage of time is displayed. The display object Rs includes an indicator Si that indicates the playback position of the pieces of content. Furthermore, the display object Rs includes an area R1 that corresponds to the piece of content C1, an area R2 that corresponds to the piece of content C2, an area R3 that corresponds to the piece of content C3, an area R4 that corresponds to the piece of content C4, and an area R5 that corresponds to the piece of content C5.

The output unit 130 may be controlled by the output control unit 122 so that the area R1 corresponding to the piece of content C1 is displayed so as to correspond to the movement range of the indicator Si from the start of playback to the end of playback of the piece of content C1. In a similar manner, the output unit 130 may be controlled by the output control unit 122 so that the areas R2 to R5 corresponding to the pieces of content C2 to C5 are displayed so as to correspond to the movement ranges of the indicator Si from the start of playback to the end of playback of the pieces of content C2 to C5.

Note that in the example illustrated in FIG. 6, the position where 1 minute 23 seconds has passed from the start of the playback of the piece of content C3 is the current playback position. At the above moment, the output control unit 122 displays the playback position Tm1 of the piece of content C3 currently played back as "1 minute 23 seconds". Furthermore, the output control unit 122 displays, in the area R3 corresponding to the piece of content C3, the area corresponding to the start of the playback of the piece of content C3 to the current playback position Tm1 as area R31, and displays, in the area R3 corresponding to the piece of content C3, the area corresponding to the current playback position Tm1 to the end of the playback of the piece of content C3 as area R32.

Furthermore, the output control unit 122 may move the indicator Si along a predetermined figure Q. In FIG. 6, a case in which the figure Q is a circle is illustrated; however, the figure Q may be a shape other than a circle. For example, the figure Q may be a polygon or may be an ellipse. Furthermore, the output control unit 122 moves the indicator Si to move around the figure Q in a predetermined time. In the present description, a case in which the predetermined time is 60 minutes is mainly described; however, the length of the predetermined time is not particularly limited to any length.

The playback position of the content may be changed according to the pointing operation of the user. The output control unit 122 may be capable of changing the playback position of the content according to the position of the pointing operation of the user, corresponding to the display object Rs. Specifically, when the pointing operation of the user is performed to either one of the positions in the areas R1 to R5, the output control unit 122 is capable of making the position of the piece of content corresponding to the pointing position to be the playback position. For example, the indicator Si can be moved to the pointing position.

Note the playback position may be capable of being set to the head of the piece of content. For example, while the piece of content C3 is played back, when an operation selecting item "forward" that is displayed by an operation of tapping a menu M is performed, the output control unit 122 may set the playback position to the head of the piece of content C2. Furthermore, for example, while the piece of content C3 is played back, when an operation selecting item "next" that is displayed by an operation of tapping the menu M is performed, the output control unit 122 may set the playback position to the head of the piece of content C4.

Based on the operation of the user, the output control unit 122 may adjust the size of the figure Q, and associated with the size adjustment of the figure Q, the sizes of the areas R1 to R5 may be adjusted. For example, when a pinch-out operation is performed by the user, the output control unit 122 may enlarge the figure Q, and associated with the enlargement of the figure Q, the sizes of the areas R1 to R5 may be increased. With the above, the play that position can be adjusted in a highly accurate manner. On the other hand, for example, when a pinch-in operation is performed by the user, the output control unit 122 may reduce the size of the figure Q, and associated with the reduction in size of the figure Q, the sizes of the areas R1 to R5 may be reduced. The size adjustment operation is not particularly limited to any operation.

Furthermore, on the basis of the operation of the user, the output control unit 122 may rotate the areas R1 to R5 and the indicator Si. For example, when a drag operation rotating two points is performed by the user, the output control unit 122 may rotate the areas R1 to R5 and the indicator Si on the basis of the rotation angle.

While the piece of content is played back, the output control unit 122 may rotate the predetermined inner area In that exists inside the movable range of the indicator Si. With the above, when the inner area In is rotating, the user can easily perceive that the piece of content is played back. Furthermore, when a predetermined stop operation is performed by the user, as well as stopping the playback of the piece of content, the output control unit 122 may stop the rotation of the inner area In.

With the above, by confirming the stop of the inner area In, the user can easily confirm that the playback of the piece of content has been stopped. The predetermined stop operation is not particularly limited to any operation, and may be an operation of tapping the inner area In or may be an operation of selecting an item "stop" that is displayed by an operation of tapping the menu M.

Furthermore, when a predetermined restart operation is performed by the user, as well as restarting the playback of the piece of content, the output control unit 122 may restart the rotation of the inner area In. The predetermined restart operation is not particularly limited to any operation, and may be an operation of tapping the inner area In or may be an operation of selecting an item "restart" that is displayed by an operation of tapping the menu M.

Note that the speed of the playback of the piece of content may be capable of being changed by a drag operation to the inner area In. For example, when a drag operation is performed to the inner area In in the direction forwarding the playback time, the output control unit 122 may playback the piece of content at a speed corresponding to the amount of movement of the drag operation. Alternatively, when a drag operation is performed to the inner area In in the direction reversing the playback time, the output control unit 122 may play the piece of content backwards at a speed corresponding to the amount of movement of the drag operation. Furthermore, the output control unit 122 may change the rotation of the inner area In according to the playback speed of the piece of content. For example, when the playback speed of the piece of content is doubled, the output control unit 122 may also double the rotation speed of the inner area In. Furthermore, for example, in the case of playing backwards, the output control unit 122 may rotate the inner area In a reverse manner. Note that among the portions that is to be displayed in the inner area In, the portion that is hidden may be displayed by a drag operation by the user.

In order for the user to intuitively perceive the piece of content that is being played back, the output control unit 122 may control the output unit 130 so that image data corresponding to the piece of content that is being played back is displayed. In the example illustrated in FIG. 6, the output control unit 122 is controlling the output unit 130 so that image data G0 corresponding to the piece of content C3 that is being played back is displayed in the inner area In. However, the area in which the image data G0 corresponding to the piece of content C3 that is being played back is displayed is not limited to the inner area In and may be an area Ou that is outside the movable range of the indicator Si.

Furthermore, in order for the user to intuitively perceive the pieces of content subject to playback, the output control unit 122 may control the output unit 130 so that at least some in the group of image data corresponding to the plurality of pieces of content that are pieces of content subject to playback are displayed. In the example illustrated in FIG. 6, the output control unit 122 has made image data G1 to G5 corresponding to the pieces of content C1 to C5 subject to playback be displayed in the inner area In. However, the area in which the pieces of image data G1 to G5 corresponding to the pieces of content C1 to C5 that are being played back is displayed is not limited to the inner area In and may be the outer area Ou.

Furthermore, in order to provide the user information related to the piece of content that is being played back, the output control unit 122 may control the output unit 130 so that text data corresponding to the piece of content that is being played back is displayed. In the example illustrated in FIG. 6, the output control unit 122 has made text data Tb corresponding to the pieces of content C3 that is being played back be displayed in the inner area In. However, the area where the text data Tb is displayed is not limited to the inner area In and may be the outer area Ou.

Note that in the example illustrated in FIG. 6, the text data Tb includes titles of the group of content including the piece of content C3 that is being played back, the names of the artists of the group of content, and the name of the piece of content that is being played back. However, the text data Tb corresponding to the piece of content C3 that is being played back is not limited to the above.

Furthermore, if text data is extracted from the image data G0 corresponding to the piece of content C3 that is being played back, the output control unit 122 may display text data that matches the metadata corresponding to the piece of content C3.

Furthermore, the color of the area corresponding to the piece of content is not particularly limited to any color; however, color information of the area corresponding to the piece of content may be determined based on color information extracted with the output control unit 122 from image data corresponding to the piece of content. By doing so, when the user adjusts the playback position of the piece of content, there will be an advantageous effect in that the impression of the color of the image data can be given to the user in a stronger manner. The color information extracted from the image data may be image data that is extracted from the entire image data or may be color information extracted from an area having a color that is the same or similar to that of the image data in a size exceeding a certain degree.

For example, in the example illustrated in FIG. 6, the output control unit 122 may match the color information of the area R1 corresponding to the piece of content C1 to the color information extracted from the image data G1 corresponding to the piece of content C1. In a similar manner, the output control unit 122 may match the pieces of color information of the areas R2 to R5 corresponding to the pieces of content C2 to C5 to the pieces of color information extracted from the pieces of image data G2 to G5 corresponding to the pieces of content C2 to C5.

Furthermore, the color of the text data Tb is not particularly limited to any color and the color information of the text data Tb may preferably be determined based on the color information of the character string Ta extracted from the image data G0 with the output control unit 122. By doing so, the impression, which the user receives from the characters of the image data, can be given to the user in a stronger manner. In the example illustrated in FIG. 6, the character string Ta includes titles of the group of content including the piece of content C3 that is being played back, the names of the artists of the group of content, and the like. However, the character string Ta is not limited to the above.

Furthermore, the color of a background Bk of the text data Tb is not particularly limited to any color and the color information of the background Bk of the text data Tb may preferably be determined based on the color information extracted from the image data G0 with the output control unit 122. By doing so, the impression received from the color of the image data G0 can be given to the user in a stronger manner. The color information extracted from the image data G0 may be image data that is extracted from the entire image data or may be color information extracted from an area having a color that is the same or similar to that of the image data in a size exceeding a certain degree.

When the color of the background Bk in the color of the text data Tb are similar, processing to increase the visibility of the text data Tb may be performed. More specifically, when the difference between the color information (RGB, CIE, Luv, Lab, and HSV values) of the background Bk and the color information of the text data Tb is within a predetermined range, the output control unit 122 may select a color that is in contrast with the color of the background Bk as the color of the text data Tb. Alternatively, when the difference is within a predetermined range, the output control unit 122 may select, as the color of the text date Tb, a color that is far from the color of the background Bk from candidate colors (white and black, for example) or may select a specific color (such as white) determined in advance.

In addition, compared to the pieces of information related to the pieces of content that have already been played back, the information related to the piece of content that is being played back and pieces of information related to the pieces of content that are to be played back may be displayed with a higher brightness. By doing so, interest of the user towards the piece of content that is being played back and the pieces of content that are to be played back can be increased.

For example, the output control unit 122 may reduce the brightness in the areas R1 and R2 corresponding to the pieces of content C1 and C2 that have already been played back and the brightness in the area R31 corresponding to the start of playback to the current playback position Tm1 of the piece of content C3. Furthermore, for example, the output control unit 122 may increase the brightness in the area R32 corresponding to the current playback position Tm1 to the end of playback of the piece of content C3 and the brightness in the areas R4 and R5 corresponding to the pieces of content C4 and C5 that are to be played back.

Furthermore, in the example illustrated in FIG. 6, the output control unit 122 displays the image data G1 to G5 corresponding to the pieces of content C1 to C5 subject to playback. Among the above, for example, the output control unit 122 may reduce the brightness in the image data G1 and G2 corresponding to the pieces of content C1 and C2 that have already been played back. Furthermore, for example, the output control unit 122 may increase the brightness in the image data G3 corresponding to the piece of content C3 that is being played back and the brightness in the image data G4 and G5 corresponding to the pieces of content C4 and C5 that is to be played back. Note that in the example illustrated in FIG. 6, although the image data G3 and the image data G0 at the same, they may be different.

The location in which various pieces of data (for example, image data and text data) used by the output control unit 122 is stored is not limited to any location. For example, the various pieces of data used by the output control unit 122 may be stored inside the information processing system 100. In such a case, the output control unit 122 may acquire and use the various pieces of data stored inside the information processing system 100. Furthermore, the various pieces of data used by the output control unit 122 may be stored outside (a server, for example) the information processing system 100. In such a case, the output control unit 122 may acquire and use the various pieces of data stored outside the information processing system 100.

The user may be capable of increasing and decreasing the pieces of content subject to playback. For example, a case is assumed in which an object corresponding to a piece of content that is unregistered as the piece of content subject to playback is displayed in the outer area Ou. In such a case, when moving of the object into the inner area In is detected, the output control unit 122 may add the piece of content corresponding to the object to the pieces of content subject to playback.

The object corresponding to the unregistered piece of content may initially be displayed in the outer area Ou, or when a terminal of the user is recognized by the detection unit 121 from a picked up image, the objects corresponding to the pieces of content stored in the terminal of the user may be displayed. Furthermore, when a package (a CD jacket, for example) of a storage medium in which pieces of content are recorded is recognized by the detection unit 121 from a picked up image, objects corresponding to the pieces of content may be displayed.

Furthermore, the shape and color of the displayed object are not particularly limited to any shape and color. For example, the displayed object may be an icon of a file in, or may be a playlist of the group of content. Where the contents subject to playback is added is not limited to any location and may be added at the end of the pieces of content subject to playback. On the other hand, for example, when moving of either one of the pieces of image data G1 to G5 to the outer area Ou is detected, the output control unit 122 may delete the piece of content corresponding to the image data from the pieces of content subject to playback.

The control of the volume of the audio that is output as a result of the playback of the pieces of content may be enabled by performing a selection operation on an item "volume control" that is displayed by a tapping operation of the menu M. Furthermore, the control of the volume of the audio that is output as a result of the playback of the pieces of content may be enabled by operating a global menu or the like. In such a case, a volume of an audio output from another application may be controlled at the same time.

Furthermore, audio control may be performed according to the display (the size and the position, for example) of the display object Rs. For example, the output control unit 122 may control the volume according to the size of the display object Rs. Specifically, for example, the output control unit 122 may increase the volume as the display object Rs becomes larger, or may increase the volume with respect to the volume when the display object Rs is smaller than a threshold value when the display object Rs is larger than the threshold value.

For example, the output control unit 122 may control the sound quality according to the size of the display object Rs. Specifically, the output control unit 122 may control the equalizer settings according to the size of the display object Rs. More specifically, when the size of the display object Rs is larger than a threshold value, the output control unit 122 may set the equalizer settings to low sound emphasis, and when smaller than the threshold value, the equalizer settings may not be set to low sound emphasis. Furthermore, for example, when the size of the display object Rs is larger than a threshold value, the output control unit 122 may turn on the woofer, and when smaller than the threshold value, the woofer may be turned off.

For example, the output control unit 122 may control the directivity of the sound according to the size of the display object Rs. Specifically, when the display object Rs is larger than a predetermined size, the output control unit 122 may have the sound output to the entire space inside the room from all of the loudspeakers, and when the size of the display object Rs is smaller than the predetermined size, sound may be output in a predetermined direction (for example, the direction in which the display object Rs is displayed on the display surface) from directional loudspeakers. Furthermore, the output control unit 122 may control the directivity of the sound according to the position of the display object Rs, or may control the directivity of the sound according to the orientation of the display object Rs.

Note that when the user increases the pieces of content subject to playback, a situation may occur in which the total playback time of the pieces of content subject to playback exceeds a predetermined time period. In such a situation, the plurality of areas included in the display object Rs may exceed the full round of the figure Q. Accordingly, when the total amount of playback time of the pieces of content subject to playback exceeds a predetermined time period, the output control unit 122 may change the display of the display object Rs. The change in display of the display object Rs may be an additional object being displayed or may be changes in the shape, color, and the like of the display object Rs that is already displayed. When the playback time of the pieces of content subject to playback exceeds a predetermined time period, the output control unit 122 may control the output unit 130 such that the object for controlling the plurality of areas included in the display object Rs is displayed as an example of the additional object.

Figure 7:
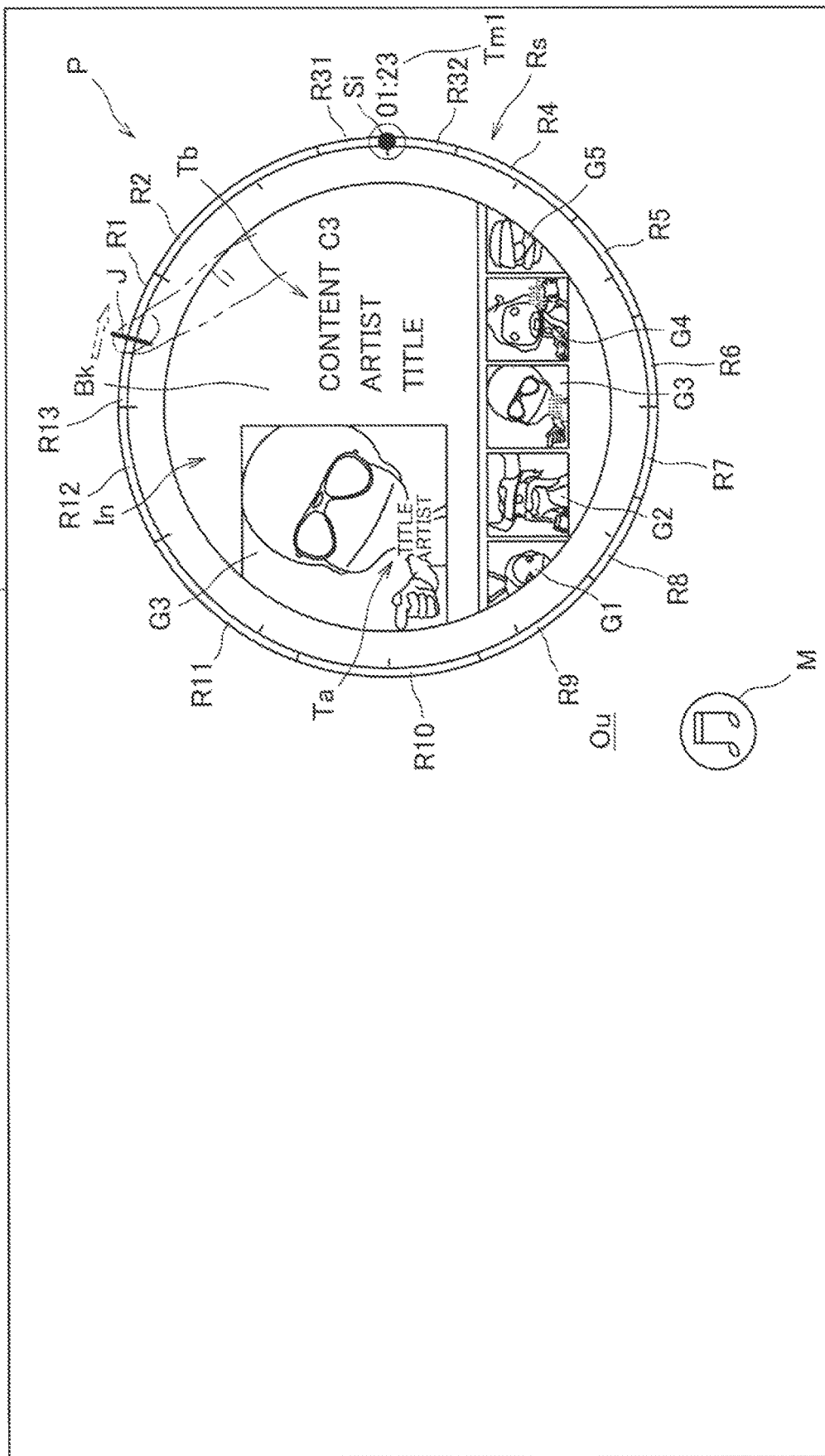
FIG. 7 is a diagram illustrating an example of a GUI in which display thereof is controlled with an information processing system 100 according to an embodiment of the present disclosure.

FIG. 7 is a diagram illustrating an example of a GUI in which display thereof is controlled with the information processing system 100 according to an embodiment of the present disclosure. As illustrated in FIG. 7, when pieces of content C6 to C12 are added to the pieces of content subject to playback, the output control unit 122 adds area R6 to R12 corresponding to the pieces of content C6 to C12. At this moment, the total playback time of the pieces of content C1 to C12 subject to playback reaches the predetermined time period. In such a situation, when a piece of content C13 is added to the pieces of content subject to playback, the total playback time of the pieces of content subject to playback exceeds the predetermined time period. In such a case, the output control unit 122 may display an object J for controlling the plurality of areas included in the display object Rs.

For example, the output control unit 122 may display the object J at the head position of the area R1 corresponding to the piece of content C1. As illustrated in FIG. 7, when an operation of moving the object J in the direction forwarding the playback time is detected, it will be possible for the output control unit 122 to display the area R13, which had not been displayed until then, in place of the area R1 corresponding to the piece of content C1 that is played back first. On the other hand, in the situation illustrated in FIG. 7, when an operation of moving the object J in the direction reversing the playback time is detected, it will be possible for the output control unit 122 to display the area R1 in place of the area R13 corresponding to the piece of content C3. The operation of moving the object J may be a drag operation.

The display of the inner area In may be switchable with the operation of the user. In other words, when the user performs a predetermined switching operation, the output control unit 122 may switch the display of the inner area In. The switching operation is not particularly limited to any operation, and may be a double tapping operation in the inner area In, may be an operation of long pressing the inner area In, or may be an operation of selecting an item "switch" displayed by an operation of tapping the menu M.

Figure 8:
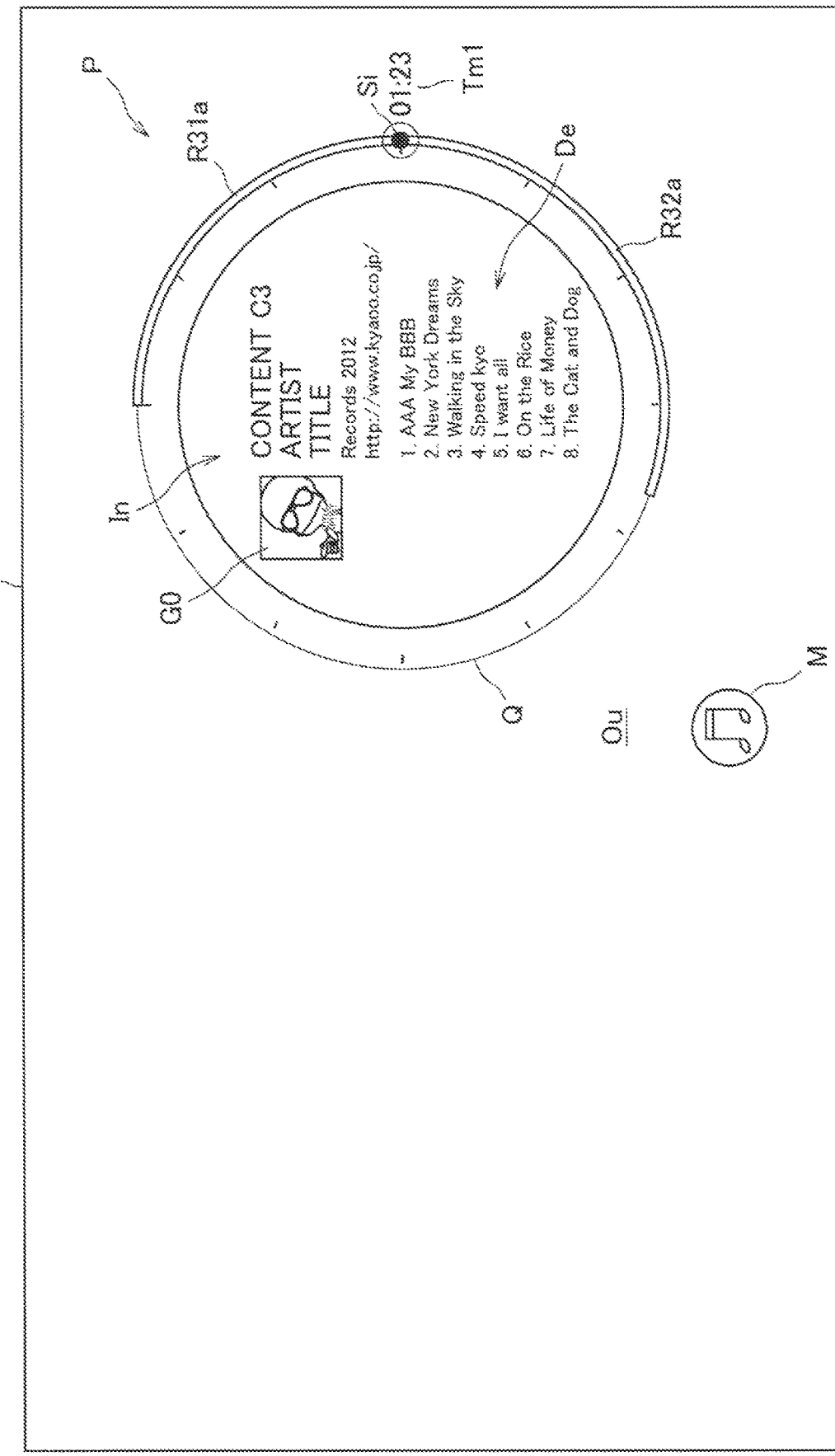
FIG. 8 is a diagram illustrating an example of a GUI in which display thereof is controlled with an information processing system 100 according to an embodiment of the present disclosure.

When the display of the inner area In is switched, a predetermined animation may be displayed. For example, the animation may be an animation in which the display object Rs and the inner area In become flipped over. The display of the inner area In after the switching is not particularly limited to any display. Referring to FIG. 8, an exemplary display of the inner area In after switching will be described. FIG. 8 is a diagram illustrating an example of a GUI in which display thereof is controlled with the information processing system 100 according to an embodiment of the present disclosure.

As illustrated in FIG. 8, the output control unit 122 may display, in the switched inner area In, pieces of information De related to the piece of content C3 being played back. In the example illustrated in FIG. 8, the pieces of information De related to the piece of content C3 the is being played back include the title of the group of content, the name of the artist of the group of content, the producer of the group of content, the released year of the group of content, the URL of the web site of the production company, the names of the pieces of content C1 to C8 included in the group of content, and the image data G0 corresponding to the piece of content C3 that is being played back. However, the pieces of information De related to the piece of content C3 that is being played back is not particularly limited to any piece of information. The pieces of information De related to the piece of content C3 that is being played back may include recommendation information (another group of content produced by the same producer, and the group of content in the favorites of a user that accesses the same group of content, for example) and information related to the producer.

Note that in the example illustrated in FIG. 8, the output control unit 122 displays, in the area R3 corresponding to the piece of content C3 that is being played back, the area corresponding to the start of the playback of the piece of content C3 to the current playback position Tm1 as area R31a, and displays, in the area R3 corresponding to the piece of content C3, the area corresponding to the current playback position Tm1 to the end of the playback of the piece of content C3 as area R32a. Note that as illustrated in FIG. 8, the areas of the pieces of content other than the piece of content C3 that is being played back do not have to be displayed.

An example in which the display of the inner area In is switched by the operation of the user has been described above. The position of the indicator Si can be unrelated to the actual clock time; however, the position may be controlled on the basis of the actual clock time by the output control unit 122. By controlling the position of the indicator Si on the basis of the actual clock time, it will be possible for the user to perceive the actual clock time. A mode that is unrelated to the actual clock time and a mode that is based on the clock time may be switchable with the operation of the user. The actual time may be acquired from a clock that is incorporated inside the information processing system 100 or may be acquired from a clock incorporated outside (a server, for example) the information processing system 100.

Figure 9:
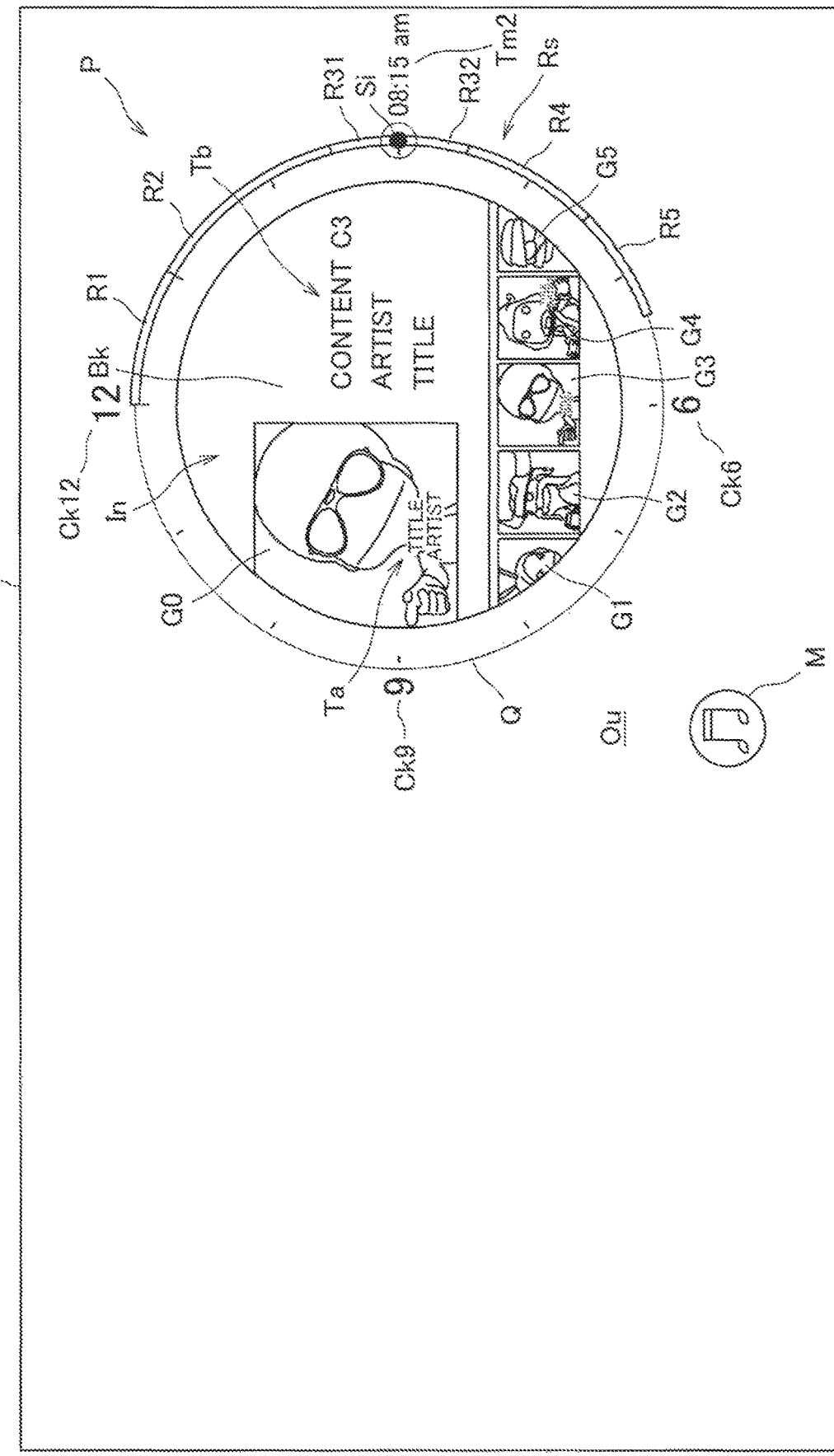
FIG. 9 is a diagram illustrating an example of a GUI in which display thereof is controlled with an information processing system 100 according to an embodiment of the present disclosure.

A specific example will be described with reference to FIG. 9. FIG. 9 is a diagram illustrating an example of a GUI in which display thereof is controlled with the information processing system 100 according to an embodiment of the present disclosure The output control unit 122 may display information on the actual clock time according to the correspondence relation between the actual clock time and the figure Q. For example, as illustrated in FIG. 9, the output control unit 122 may display, along the figure Q, a piece of information Ck6 of the actual clock time illustrating "6 o'clock", a piece of information Ck9 of the actual clock time illustrating "9 o'clock", and a piece of information Ck12 of the actual clock time illustrating "12 o'clock". Note that the intervals of the displayed pieces of information of the actual clock time is not limited to intervals of three hours, and may be intervals of one hour, or may be intervals of other hours.

The indicator Si may be controlled by the output control unit 122 so as to be disposed at a position in the figure Q corresponding to the actual clock time. For example, as illustrated in FIG. 9, when the actual clock time is "8:15 a.m.", the indicator Si may be controlled by the output control unit 122 so as to be disposed at a position in the figure Q corresponding to "8:15 a.m.". Furthermore, the output control unit 122 may perform control such that the piece of information of the clock time indicating the actual clock time "8:15 a.m." is indicated as actual clock time information Tm2.

Note that as described above, the playback position of the content may be changed according to the pointing operation of the user. Note that in the above description, an example in which the indicator Si move to the pointing position has been given; however, when the position of the indicator Si is controlled based on the actual clock time, it is better not to move the actual clock time information that is displayed. Accordingly, when the position of the indicator Si is controlled based on the actual clock time, preferably, the output control unit 122 may move the plurality of areas R1 to R5 such that the position that is pointed in the plurality of areas R1 to R5 matches the position of the indicator Si.

Figure 10:
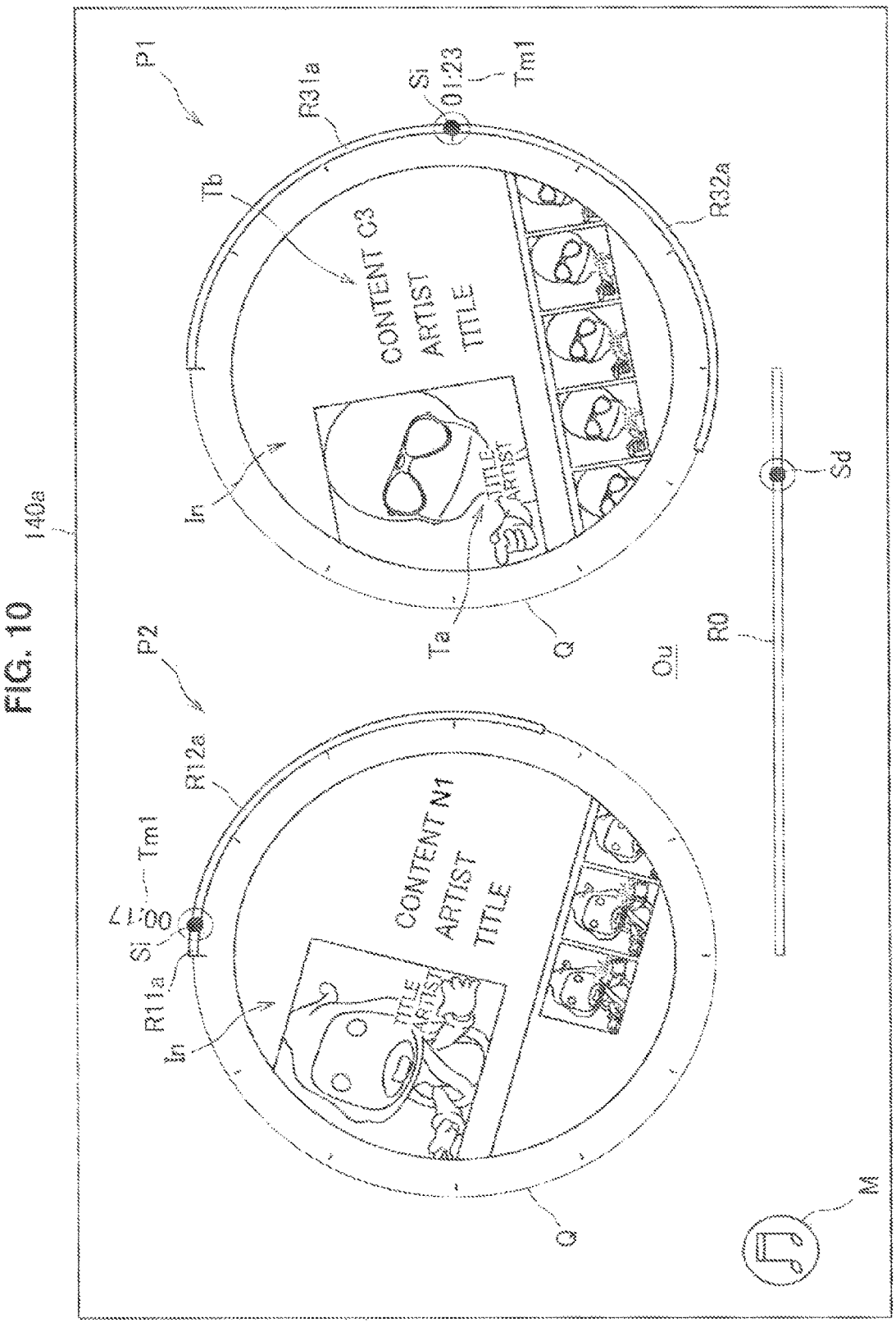
FIG. 10 is a diagram illustrating an example of a GUI in which display thereof is controlled with an information processing system 100 according to an embodiment of the present disclosure.

An example in which the position of the indicator Si is controlled based on the actual clock time has been described above. In the above, a case in which the number of operation objects is one has been described mainly; however, in a case in which the user performs a predetermined plural display operation, two operation objects may be generated. A specific example will be described with reference to FIG. 10. FIG. 10 is a diagram illustrating an example of a GUI in which display thereof is controlled with the information processing system 100 according to an embodiment of the present disclosure.

As illustrated in FIG. 10, when the user performs a predetermined plural display operation, the output control unit 122 may generate an operation object P1 and an operation object P2. The plural display operation is not particularly limited to any operation, and may be an operation of long pressing the inner area In at two points and dragging the two points away from each other, or may be an operation of selecting an item "plurality of displays" that is displayed by an operation of tapping the menu M.

For example, when the user performs the plural display operation, the output control unit 122 may control the output unit 130 such that a first indicator for controlling the playback position of the first piece of content, and a second indicator for controlling the playback position of the second piece of content are displayed. More specifically, as illustrated in FIG. 10, when the user performs the plural display operation while the piece of content C3 is being played back, the output control unit 122 may display the indicator Si for controlling the playback position of the piece of content C3 and the indicator Si for controlling the playback position of the piece of content N1.

Based on the position of the indicators Si, the piece of content C3 and the piece of content N1 may be played back side by side. Furthermore, the audios obtained as a result of the playback of the piece of content C3 and the piece of content N1 may be output side by side. At this moment, as illustrated in FIG. 10, the output control unit 122 may display an indicator Sd for controlling the ratio between the output volume of the piece of content C3 and the output volume of the piece of content N1.

Note that in the example illustrated in FIG. 10, the output control unit 122 displays, in the area corresponding to the piece of content N1 that is being played back, the area corresponding to the start of the playback of the piece of content N1 to the current playback position Tm1 as area R11a, and displays, in the area corresponding to the piece of content N1, the area corresponding to the current playback position Tm1 to the end of the playback of the piece of content N1 as area R12a.

A position of a seek bar R0 of the indicator Sd is not particularly limited to any position; however, as illustrated in FIG. 10, it is preferably a position corresponding to the operation object P1 and the operation object P2 (for example, a position at equal distances from the operation object P1 and the operation object P2). The color of the seek bar R0 is also not particularly limited to any color; however, for example, an end portion close to the object P1 may be determined on the basis of color information extracted from the piece of content C3 that is being played back. An end portion close to the object P2 may be determined on the basis of color information extracted from the piece of content N1 that is being played back. The color between the two end portions may change gradually.

1.4. Exemplary Hardware Configuration

Figure 11:
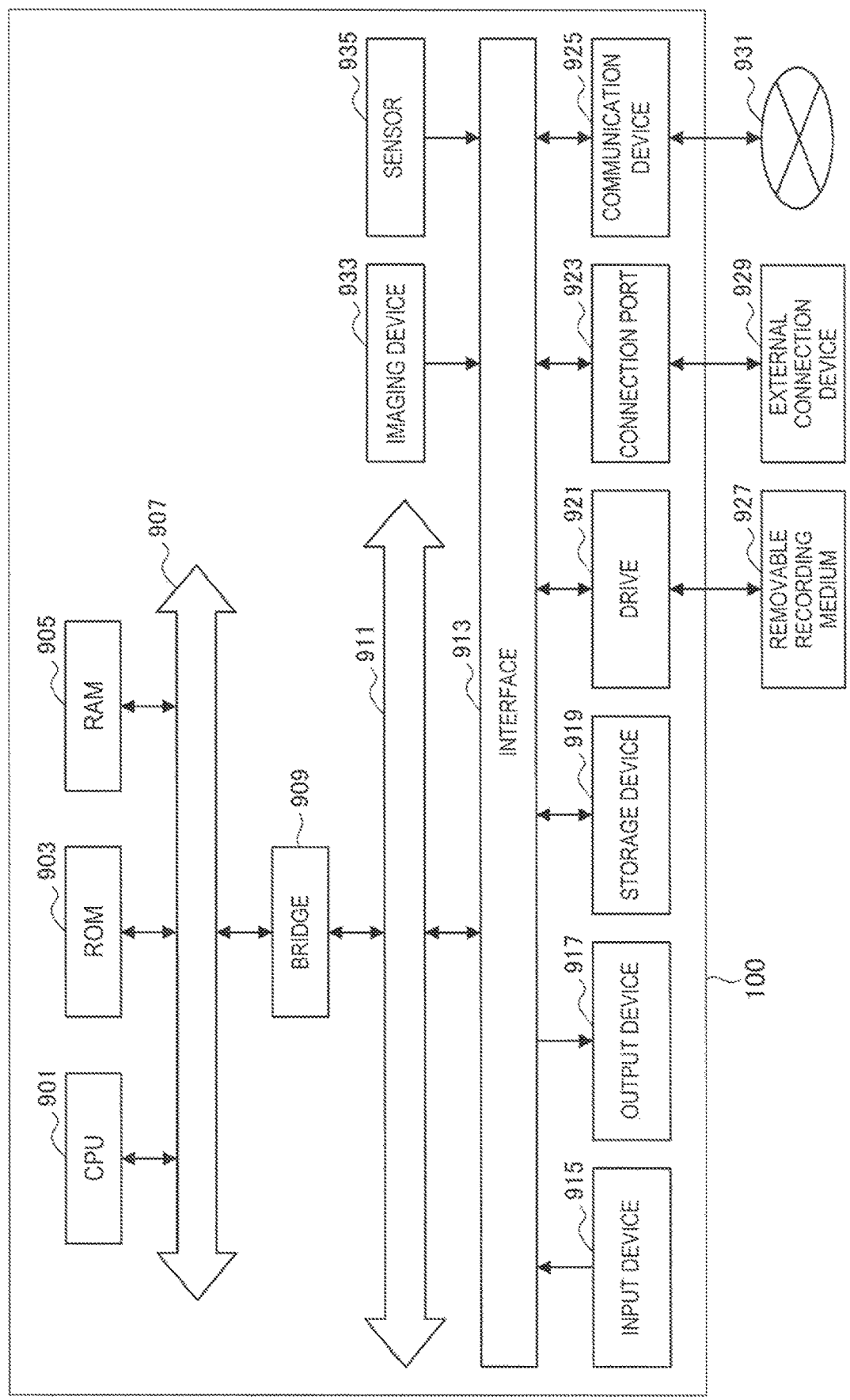
FIG. 11 is a block diagram illustrating an exemplary hardware configuration of the information processing system according to an embodiment of the present disclosure.

A hardware configuration of the information processing system 100 according to an embodiment of the present disclosure will be described next with reference to FIG. 11. FIG. 11 is a block diagram illustrating an exemplary hardware configuration of the information processing system 100 according to the embodiment of the present disclosure.

As shown in FIG. 11, the information processing system 100 includes a CPU (Central Processing Unit) 901, a ROM (Read Only Memory) 903, and a RAM (Random Access Memory) 905. In addition, the information processing system 100 may include a host bus 907, a bridge 909, an external bus 911, an interface 913, an input device 915, an output device 917, a storage device 919, a drive 921, a connection port 923, and a communication device 925. Further, the information processing system 100 may include an imaging device 933 and a sensor 935 as necessary. The information processing system 100 may include a processing circuit such as a DSP (Digital Signal Processor) or ASIC (Application Specific Integrated Circuit), alternatively or in addition to the CPU 901.

The CPU 901 serves as an operation processor and a controller, and controls all or some operations in the information processing system 100 in accordance with various programs recorded in the ROM 903, the RAM 905, the storage device 919 or a removable recording medium 927. The ROM 903 stores programs and operation parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 is a device which is operated by a user, such as a mouse, a keyboard, a touch panel, a proximity panel, buttons, switches and a lever. The input device 915 may include a microphone that detects the voice of the user. The input device 915 may be, for example, a remote control unit using infrared light or other radio waves, or may be an external connection device 929 such as a portable phone operable in response to the operation of the information processing system 100. Furthermore, the input device 915 includes an input control circuit which generates an input signal on the basis of the information which is input by a user and outputs the input signal to the CPU 901. By operating the input device 915, a user can input various types of data to the information processing system 100 or issue instructions for causing the information processing system 100 to perform a processing operation. Furthermore, an imaging device 933 described later may function as an input device as well by picking up an image of the motion of the hand of the user, and an image of the finger of the user. In the above, the pointing position may be determined according to the motion of the hand and the orientation of the finger.

The output device 917 includes a device capable of visually or audibly notifying the user of acquired information. The output device 917 may include a display device such as an LCD (Liquid Crystal Display), a PDP (Plasma Display Panel), an organic EL (Electro-Luminescence) displays, and a projector, a display device such as a hologram, an audio output device such as a speaker or a headphone, and a peripheral device such as a printer. The output device 917 may output the results obtained from the process of the information processing system 100 in a form of a video such as text or an image, and an audio such as voice or sound. Furthermore, the output device 917 may include a light for lighting up the surroundings.

The storage device 919 is a device for data storage which is configured as an example of a storage unit of the information processing system 100. The storage device 919 includes, for example, a magnetic storage device such as a HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing system 100 or attached externally thereto. The drive 921 reads information recorded in the removable recording medium 927 attached thereto, and outputs the read information to the RAM 905. Further, the drive 921 writes in the removable recording medium 927 attached thereto.

The connection port 923 is a port used to directly connect devices to the information processing system 100. The connection port 923 may include a USB (Universal Serial Bus) port, an IEEE1394 port, and a SCSI (Small Computer System Interface) port. The connection port 923 may further include an RS-232C port, an optical audio terminal, an HDMI (registered trademark) (High-Definition Multimedia Interface) port, and so on. The connection of the external connection device 929 to the connection port 923 makes it possible to exchange various data between the information processing system 100 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing system 100, such as the orientation of the case of the information processing system 100, as well as information regarding the environment surrounding the information processing system 100, such as the brightness or noise surrounding the information processing system 100, for example. The sensor 935 may also include a Global Positioning System (GPS) sensor that receives GPS signals and measures the latitude, longitude, and altitude of the apparatus.

The foregoing thus illustrates an exemplary hardware configuration of the information processing system 100. Each of the above components may be realized using general-purpose members, but may also be realized in hardware specialized in the function of each component. Such a configuration may also be modified as appropriate according to the technological level at the time of the implementation.

5. CONCLUSION

As described above, according to the embodiments of the present disclosure, provided is an information processing system 100 including an output control unit 122 that controls an output unit 130 so that a display object Rs indicating a sequential passage of time is displayed. The display object Rs indicates a playback position of pieces of content and includes a plurality of areas corresponding to the plurality of pieces of content. According to such a configuration, the user may intuitively perceive the relationship between the plurality of pieces of content and the piece of content that is currently being played back.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, a program for causing hardware, such as a CPU, ROM and RAM built into a computer, to exhibit functions similar to the functions included in the above information processing system 100 can be created. Further, a recording medium can also be provided which records these programs and is capable of performing reading to the computer.

Furthermore, by generating a piece of display control information for displaying a piece of display content on the output unit 130 and by outputting the generated piece of display control information to the output unit 130, the output control unit 122 is capable of controlling the output unit 130 to display the piece of display content on the output unit 130. Content of such a piece of display control information may be changed as appropriate according to the system configuration.

As a specific example, the program for implementing the information processing system 100 may be a web application. In such a case, the display control information may be provided with a markup language, such as a hyper text markup language (HTML), a standard generalized markup language (SGML), or an extensible markup language (XML).

Note that the positions of the components illustrated in FIG. 5 is not particularly limited to any position as long as the operation of the information processing system 100 described above is implemented. As a specific example, the input unit 110, the output unit 130, and the control unit 120 may be provided in separate devices that are connected to each other through a network. In such a case, the information processing device provided in the control unit 120 may corresponds to, for example, a server such as a web server or a cloud server, and the input unit 110 and the output unit 130 may correspond to clients that are connected to the server through the network.

In addition, the effects described in the present specification are merely illustrative and demonstrative, and not limitative. In other words, the technology according to the present disclosure can exhibit other effects that are evident to those skilled in the art along with or instead of the effects based on the present specification. Additionally, the present technology may also be configured as below.

(1) An information processing system including an output control unit configured to control a display output unit in a manner that a display object indicating a sequential passage of time is displayed, wherein the display object indicates a playback position of content, the display object including a plurality of areas corresponding to a plurality of pieces of the content.

(2) The information processing system according to (1), wherein the output control unit changes the playback position of the content according to a pointing operation of a user to a position corresponding to the object.

(3) The information processing system according to (2), wherein the object includes an indicator that indicates the playback position of the content, and wherein the indicator moves along a predetermined figure, the indicator moving around the figure in a predetermined time period.

(4) The information processing system according to (3), wherein the predetermined time period is 60 minutes.

(5) The information processing system according to (3) or (4), wherein the predetermined figure is either one of a polygon, an ellipse, and a circle.

(6) The information processing system according to (3), wherein the output control unit controls the output unit in a manner that the area corresponding to the piece of content is displayed so as to correspond to a movement range of the indicator from a start of playback of the piece of content to an end of the playback of the piece of content.

(7) The information processing system according to (3), wherein the output control unit controls a position of the indicator on a basis of an actual clock time.

(8) The information processing system according to (1), wherein the output control unit determines color information of the area corresponding to the piece of content on a basis of color information extracted from image data corresponding to the piece of content.

(9) The information processing system according to any one of (1) to (8), wherein the output control unit adjusts sizes of the plurality of areas on a basis of operations of a user.

(10) The information processing system according to (3), wherein, when a user performs a predetermined switching operation, the output control unit switches a display of a predetermined inner area existing inside a movable range of the indicator.

(11) The information processing system according to (3), wherein, while the content is being played back, the output control unit rotates a predetermined inner area existing inside a movable range of the indicator.

(12) The information processing system according to (10), wherein when the user performs a predetermined stop operation, as well as stopping the playback of the content, the output control unit stops the rotation of the predetermined inner area.

(13) The information processing system according to any one of (1) to (12), wherein, according to an operation of moving an object into a predetermined inner area existing inside a movable range of the indicator, the output control unit adds a piece of content corresponding to the object to content subject to playback.

(14) The information processing system according to any one of (1) to (13), wherein when a total amount of playback time of content subject to playback exceeds a predetermined time period, the output control unit changes a display of the display object.

(15) The information processing system according to (14), wherein as the change in the display of the display object, the output control unit controls the output unit in a manner that an object for adjusting the plurality of areas included in the display object is displayed.

(16) The information processing system according to any one of (1) to (15), wherein, when a user performs a predetermined plural display operation, the output control unit controls the output unit in a manner that a first indicator for adjusting a playback position of a first piece of content, and a second indicator for adjusting a playback position of a second piece of content are displayed.

(17) The information processing system according to (3), wherein the output control unit controls the output unit in a manner that at least a part of a group of image data corresponding to the plurality of pieces of content is displayed in a predetermined inner area existing inside a movable range of the indicator.

(18) The information processing system according to any one of (1) to (17), wherein the output control unit controls the output unit in a manner that image data corresponding to a piece of content that is being played back is displayed and controls the output unit in a manner that text data corresponding to the piece of content that is being played back is displayed.

(19) The information processing system according to (18), wherein the output control unit determines color information of the text data on a basis of color information of a character string extracted from the image data and determines color information of a background of the text data on a basis of color information extracted from the image data.

(20) An information processing method including controlling a display output unit in a manner that a display object indicating a sequential passage of time is displayed, wherein the display object indicates a playback position of content, the display object including a plurality of areas corresponding to a plurality of pieces of the content.

(21) A program for causing a computer to function as an information processing system including an output control unit configured to control a display output unit in a manner that a display object indicating a sequential passage of time is displayed, and wherein the display object indicates a playback position of content, the display object including a plurality of areas corresponding to a plurality of pieces of the content.

REFERENCE SIGNS LIST 100 (100a to 100d) information processing system
110 (110a to 110d) input unit
120 controller
121 detection unit
122 output control unit
130 (130a to 130d) output unit
140 (140a and 140b) table
Bk background
C1 to C13 content
Ck (Ck6, Ck9, and Ck12) information of actual clock time
De information related to content
G0 to G5 image data
In inner area
J object
M menu
N1 content
Ou outer area
P (P1 and P2) operation object
Q figure
R0 seek bar
R1 to R13 area
R11a area
R12a area
R31, R31a, R32, and R32a area
Rs display object
Sd indicator
Si indicator
Ta character string
Tb text data
Tm1 playback position
Tm2 information of actual clock time

The invention claimed is:

1. An information processing system, comprising:
circuitry configured to:
control display of a display object that indicates a sequential passage of time, wherein the display object comprises:
a closed figure having an inner area inside the closed figure;
a plurality of areas along an outer side of the closed figure, wherein at least one area of the plurality of areas corresponds to at least one piece of content of a plurality of pieces of content that are played back sequentially; and
a display indicator configured to:
move along the outer side of the closed figure; and
indicate a playback position of a piece of content of the plurality of pieces of content that are played back sequentially;
control display of at least a piece of information related to the at least one piece of content in the inner area;
rotate the inner area based on playback of the at least one piece of content;
control a volume of an audio based on a size of the display object, wherein the audio is associated with the playback of the at least one piece of content;
control display of image data of the at least one piece of content;
extract first color information of a character string from the image data;
determine second color information of text data and third color information of a background of the text data based on the first color information, wherein the text data corresponds to the at least one piece of content; and
control display of the text data with the image data based on the second color information and the third color information.

2. The information processing system according to claim 1, wherein
the circuitry is further configured to change the playback position of the piece of content based on a user pointing operation, and
the playback position is changed to a position of the user pointing operation corresponding to the display object.

3. The information processing system according to claim 1, wherein the closed figure is one of a polygon, an ellipse, or a circle.

4. The information processing system according to claim 1, wherein
the circuitry is further configured to control display of the at least one area, and
the at least one area corresponds to a movement range of the display indicator from a start position of the playback of the at least one piece of content to an end position of the playback of the at least one piece of content.

5. The information processing system according to claim 1, wherein the circuitry is further configured to control a position of the display indicator based on an actual clock time.

6. The information processing system according to claim 1, wherein the circuitry is further configured to determine fourth color information of the at least one area corresponding to the at least one piece of content based on the first color information.

7. The information processing system according to claim 1, wherein the circuitry is further configured to change a first size of the at least one area of the plurality of areas based on a user input.

8. The information processing system according to claim 1, wherein the circuitry is further configured to change a display of the inner area based on a user input.

9. The information processing system according to claim 1, wherein
the circuitry is further configured to add a new piece of content to the plurality of pieces of content based on a user input,
the new piece of content corresponds to a first object, and
the user input corresponds to a movement of the first object into the inner area.

10. The information processing system according to claim 1, wherein the circuitry is further configured to:
control display of a first indicator to adjust a first playback position of a first piece of content of the plurality of pieces of content; and
control display of a second indicator to adjust a second playback position of a second piece of content of the plurality of pieces of content.

11. The information processing system according to claim 1, wherein the circuitry is further configured to control display of at least a part of a group of image data corresponding to the plurality of pieces of content in the inner area.

12. The information processing system according to claim 1, wherein a position of the display indicator on the closed figure corresponds to an instantaneous time in a time period.

13. The information processing system according to claim 12, wherein the time period is 60 minutes.

14. The information processing system according to claim 1, wherein the circuitry is further configured to change the display of the display object based on a playback time of the piece of content that is greater than a threshold time period.

15. The information processing system according to claim 14, wherein the circuitry is further configured to:
display an adjustment object based on the change in the display of the display object; and
adjust the plurality of areas based on the displayed adjustment object.

16. An information processing method, comprising:
controlling display of a display object that indicates a sequential passage of time, wherein the display object comprises:
a closed figure having an inner area inside the closed figure;
a plurality of areas along an outer side of the closed figure, wherein at least one area of the plurality of areas corresponds to at least one piece of content of a plurality of pieces of content that are played back sequentially; and
an indicator configured to:
move along the outer side of the closed figure; and
indicate a playback position of a piece of content of the plurality of pieces of content that are played back sequentially;
controlling display of at least a piece of information related to the at least one piece of content in the inner area;
rotating the inner area based on playback of the at least one piece of content;
controlling a volume of an audio based on a size of the display object, wherein the audio is associated with the playback of the at least one piece of content;
controlling display of image data of the at least one piece of content;
extracting first color information of a character string from the image data;
determining second color information of text data and third color information of a background of the text data based on the first color information, wherein the text data corresponds to the at least one piece of content; and
controlling display of the text data with the image data based on the second color information and the third color information.

17. A non-transitory computer-readable medium having stored thereon computer-executable instructions that, when executed by a processor of an information processing system, cause the processor to perform operations, the operations comprising:
controlling display of a display object that indicates a sequential passage of time, wherein the display object comprises:
a closed figure having an inner area inside the closed figure;
a plurality of areas along an outer side of the closed figure, wherein at least one area of the plurality of areas corresponds to at least one piece of content of a plurality of pieces of content that are played back sequentially; and
an indicator configured to:
move along the outer side of the closed figure; and
indicate a playback position of a piece of content of the plurality of pieces of content that are played back sequentially;
controlling display of at least a piece of information related to the at least one piece of content in the inner area;
rotating the inner area based on playback of the at least one piece of content;
controlling a volume of an audio based on a size of the display object, wherein the audio is associated with the playback of the at least one piece of content;
controlling display of image data of the at least one piece of content;
extracting first color information of a character string from the image data;
determining second color information of text data and third color information of a background of the text data based on the first color information, wherein the text data corresponds to the at least one piece of content; and
controlling display of the text data with the image data based on the second color information and the third color information.

* * * * *